United States Patent
He

(10) Patent No.: US 9,118,209 B2
(45) Date of Patent: Aug. 25, 2015

(54) POWER GENERATOR DEVICE AND PORTABLE ELECTRONIC DEVICE EMPLOYING THE SAME

(71) Applicant: Quan He, Shenzhen (CN)

(72) Inventor: Quan He, Shenzhen (CN)

(73) Assignees: SHENZHEN FUTAIHONG PRECISION INDUSTRY CO., LTD., Shenzhen (CN); Chi Mei Communication Systems, Inc., New Taipei (TW)

( * ) Notice: Subject to any disclaimer, the term of this patent is extended or adjusted under 35 U.S.C. 154(b) by 316 days.

(21) Appl. No.: 13/660,062

(22) Filed: Oct. 25, 2012

(65) Prior Publication Data

US 2013/0207600 A1   Aug. 15, 2013

(30) Foreign Application Priority Data

Feb. 15, 2012  (CN) .......................... 2012 2 0048265

(51) Int. Cl.
| | |
|---|---|
| H02J 7/00 | (2006.01) |
| H01F 27/42 | (2006.01) |
| H02J 7/32 | (2006.01) |
| H02J 7/02 | (2006.01) |
| H04B 5/00 | (2006.01) |
| H02K 35/02 | (2006.01) |

(52) U.S. Cl.
CPC . *H02J 7/32* (2013.01); *H02J 7/025* (2013.01); *H02K 35/02* (2013.01); *H04B 5/0037* (2013.01); *Y02B 40/90* (2013.01)

(58) Field of Classification Search
CPC ............. H02J 7/025; H02J 7/04; H01F 38/14; H01F 27/42; H04B 5/0037; H04B 5/0031
USPC .......................................... 320/108; 307/104
See application file for complete search history.

(56) References Cited

U.S. PATENT DOCUMENTS

| | | | | |
|---|---|---|---|---|
| 5,449,567 A | * | 9/1995 | Yeh ..................................... | 429/7 |
| 5,507,943 A | * | 4/1996 | Labrador ...................... | 210/136 |
| 2009/0072782 A1 | * | 3/2009 | Randall ......................... | 320/107 |
| 2010/0164431 A1 | * | 7/2010 | Sip et al. ....................... | 320/108 |
| 2012/0299299 A1 | * | 11/2012 | Chan et al. ....................... | 290/50 |
| 2013/0127408 A1 | * | 5/2013 | Chang et al. ................... | 320/108 |
| 2013/0147425 A1 | * | 6/2013 | Chang ............................ | 320/108 |

* cited by examiner

*Primary Examiner* — M'Baye Diao

(74) *Attorney, Agent, or Firm* — Novak Druce Connolly Bove + Quigg LLP

(57) ABSTRACT

A power generator device for a portable electronic device includes a main body, a magnet, and a winding. The main body defines a receiving space therein. The magnet is received in the receiving space, and is capable of sliding in the receiving space. The winding is coiled on the main body. When the magnet slides in the receiving space, the winding cuts magnetic force lines of the magnet, and induction current is generated in the winding to charge a rechargeable battery of the portable electronic device.

11 Claims, 2 Drawing Sheets

POWER GENERATOR DEVICE AND PORTABLE ELECTRONIC DEVICE EMPLOYING THE SAME

BACKGROUND

1. Technical Field

The present disclosure relates to power generator devices for portable electronic devices, and particularly to a power generator device utilizing kinetics and a portable electronic device employing the same.

2. Description of Related Art

Rechargeable batteries are widely used in portable electronic devices, such as mobile phones, personal digital assistants, and laptop computers, for example.

When recharging the rechargeable batteries, the rechargeable batteries generally need to be electrically connected to external power supplies (e.g., wall sockets) using power cords. If a user of a portable electronic device using a rechargeable battery fails to find an external power supply, or forgets to carry a power cord adapted to the rechargeable battery, the user may be unable to recharge the rechargeable battery.

Therefore, there is room for improvement within the art.

BRIEF DESCRIPTION OF THE DRAWINGS

Many aspects of the present disclosure can be better understood with reference to the following drawings. The components in the various drawings are not necessarily drawn to scale, the emphasis instead being placed upon clearly illustrating the principles of the present disclosure. Moreover, in the drawings, like reference numerals designate corresponding parts throughout the figures.

DETAILED DESCRIPTION

Figure 1:
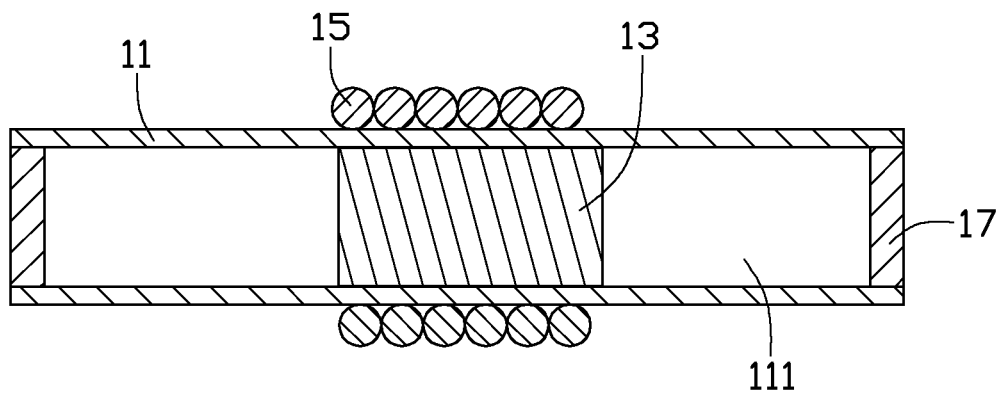
FIG. 1 is a longitudinal cross-section view of a power generator device, according to an exemplary embodiment.

FIG. 1 is a longitudinal cross-section view of a power generator device 10, according to an exemplary embodiment. The power generator device 10 can be built in a portable electronic device, such as a mobile phone, a laptop computer, a personal digital assistant, etc. When a portable electronic device with the power generator device 10 built therein is used or carried, movements of the portable electronic device can cause the power generator device 10 to generate electrical power for charging a rechargeable battery of the portable electronic device. That is, the power generator device 10 can transform kinetics of the portable electronic device into electrical power.

The power generator device 10 includes a main body 11, a magnet 13, a winding 15, and two elastic elements 17. The main body 11 is substantially a hollow cylinder made of insulating materials, such as ceramics or plastics. A cylindrical receiving space 111 is defined in the main body 11 and opens at two opposite ends of the main body 11. The main body 11 and the receiving space 111 are coaxial. An inner surface of the main body 11 corresponding to the receiving space 111 is smooth.

The magnet 13 is cylindrical and has a smooth outer surface. The magnet 13 is received in the receiving space 111. A length of the magnet 13 is less than a length of the receiving space 111, and a diameter of the magnet 13 equals or is less than a diameter of the receiving space 111. Thus, the magnet 13 can slide back and forth in the receiving space 111, along a mutual axis (not shown) of the receiving space 111 and the main body 11.

The winding 15 is coiled on an outer surface of the main body 11. In the exemplary embodiment, the winding 15 is coiled on a middle portion of the outer surface of the main body 11. When the magnet 13 slides in the receiving space, the winding 15 can cut the magnetic force lines (not shown) of the magnet 13 so that induction current is generated in the winding 15. The induction current can be utilized to charge the portable electronic device employing the power generator device 10.

The two elastic elements 17 can be springs, elastic filler blocks, or elastic gaskets. The two elastic elements 17 are respectively fixed at two opposite ends of the receiving space 111 to close both the two openings of the receiving space 111. In this way, the magnet 13 is retained in the main body 11. When the magnet 13 slides and reaches either end of the receiving space 111, the elastic element 17 fixed at the end of the receiving space 111 rebounds the magnet 13, so that the magnet 13 is enabled to slide back and forth in the receiving space 111.

Figure 2:
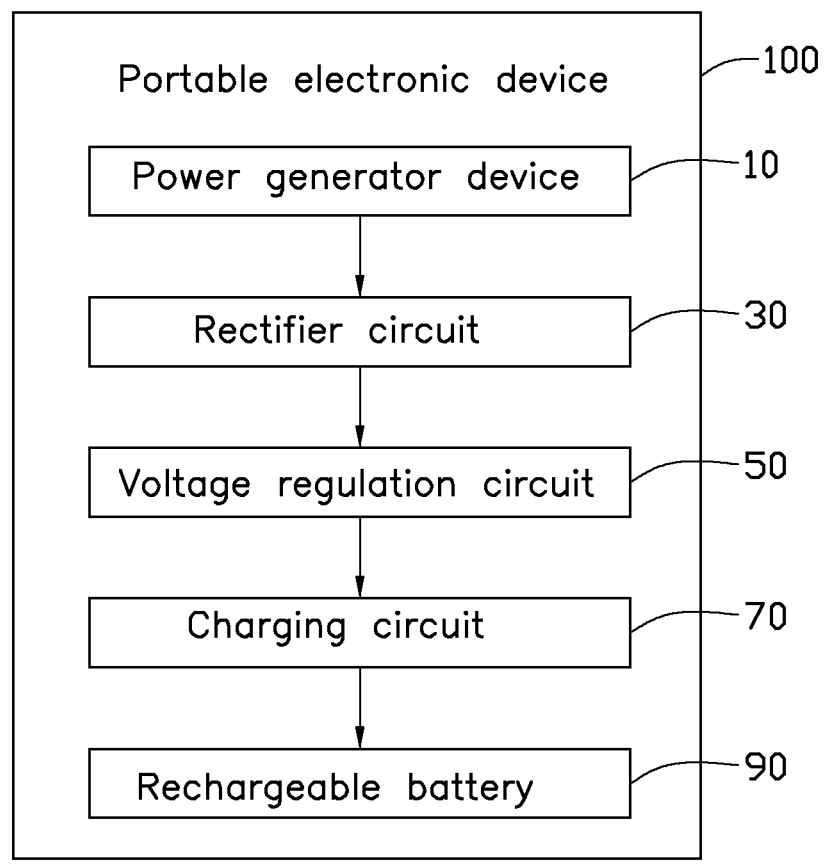
FIG. 2 is a block diagram of a portable electronic device employing the power generator device shown in FIG. 1, according to an exemplary embodiment.

FIG. 2 is a block diagram of a portable electronic device 100 employing the power generator device 10, according to an exemplary embodiment. The portable electronic device 100 includes the power generator device 10, a rectifier circuit 30, a voltage regulation circuit 50, a charging circuit 70, a rechargeable battery 90, and other common functional elements (not shown), such as a circuit board, a display, a keypad, etc. The power generator device 10, the rectifier circuit 30, the voltage regulation circuit 50, the charging circuit 70, and the rechargeable battery 90 are electrically connected in series. In particular, two ends of the winding 15 are electrically connected to the rectifier circuit 30.

In use, the portable electronic device 100 is carried and used according to typical methods, for example, being used to call, to capture images, and to play computer games, etc. In the processes of carrying and using the portable electronic device 100, the portable electronic device 100 is frequently moved. The movements of the portable electronic device 100 cause the magnet 13 to slide in the receiving space 111, and the elastic elements 17 rebound the magnet 13 to slide back and forth, according to the aforementioned method. In this way, the winding 15 cuts the magnetic force lines of the magnet 13 repeatedly, and induction current is generated in the winding 15. When the magnet 13 slides back and forth, the winding 15 alternately cuts the magnetic force lines of the magnet 13 along two opposite directions, and a direction of the induction current alternates correspondingly. Therefore, the induction current generated in the winding 15 is alternating current (AC).

The induction current generated in the winding 15 is transmitted to the rectifier circuit 30. The rectifier circuit 30 converts the induction current to direct current (DC), and generates a DC voltage corresponding to the DC (e.g., using a typical current-to-voltage converter). The voltage regulation circuit 50 regulates the DC voltage to a charging voltage with a predetermined voltage value. The charging circuit 90 transmits the charging voltage to the rechargeable battery 90 to charge the rechargeable battery 90.

In the present disclosure, movements of the portable electronic device 100 can cause the power generator device 10 to generate the induction current, and the induction current can be used to charge the rechargeable battery 90. That is, the power generator device 10 can transform kinetics of the portable electronic device 100 into electrical power to charge the rechargeable battery 90. In this way, despite absence of external power supplies and power cords, the rechargeable battery 90 is still capable of being charged.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A power generator device for a portable electronic device, comprising:
    a main body defining a receiving space therein;
    a magnet received in the receiving space and being capable of sliding in the receiving space;
    a winding coiled on the main body; and
    two elastic elements;
    wherein the receiving space opens at two opposite ends of the main body, the two elastic elements are respectively fixed at two opposite ends of the receiving space to close both the two openings of the receiving space for retaining the magnet in the main body, when the magnet slides in the receiving space, the winding cuts magnetic force lines of the magnet, and induction current is generated in the winding to charge a rechargeable battery of the portable electronic device.

2. The power generator device of claim 1, wherein the main body is made of insulating material.

3. The power generator device of claim 1, wherein the main body and the receiving space are coaxial.

4. The power generator device of claim 1, wherein when the magnet slides in the receiving space and reaches the elastic element, the elastic element rebounds the magnet, so that the magnet is enabled to slide back and forth in the receiving space.

5. A portable electronic device, comprising:
    a rechargeable battery; and
    a power generator device electrically connected to the rechargeable battery, the power generator device including:
        a main body defining a receiving space therein;
        a magnet received in the receiving space and being capable of sliding in the receiving space due to movements of the portable electronic device;
        a winding coiled on the main body; and
        two elastic elements;
        wherein the receiving space opens at two opposite ends of the main body, the two elastic elements are respectively fixed at two opposite ends of the receiving space to close both the two openings of the receiving space for retaining the magnet in the main body, when movements of the portable electronic device cause the magnet to slide in the receiving space, the winding cuts magnetic force lines of the magnet, and induction current is generated in the winding to charge the rechargeable battery.

6. The portable electronic device of claim 5, wherein the main body is made of insulating material.

7. The portable electronic device of claim 5, wherein the main body and the receiving space are coaxial.

8. The portable electronic device of claim 5, wherein when the magnet slides in the receiving space and reaches the elastic element, the elastic element rebounds the magnet, so that the magnet is enabled to slide back and forth in the receiving space.

9. The portable electronic device of claim 5, further comprising a rectifier circuit; wherein the rectifier circuit is electrically connected between the winding and the rechargeable battery, and is configured for converting alternating current (AC) generated in the winding to direct current (DC) and generating a DC voltage corresponding to the DC.

10. The portable electronic device of claim 9, further comprising a voltage regulation circuit; wherein the voltage regulation circuit is electrically connected between the rectifier circuit and the rechargeable battery, and is configured for regulating the DC voltage generated by the rectifier circuit to a charging voltage with a predetermined voltage value.

11. The portable electronic device of claim 10, further comprising a charging circuit; wherein the charging circuit is electrically connected between the voltage regulation circuit and the rechargeable battery, and is configured for transmitting the charging voltage to the rechargeable battery to charge the rechargeable battery.

* * * * *